United States Patent
Kuijpers et al.

(10) Patent No.: US 7,116,877 B2
(45) Date of Patent: Oct. 3, 2006

(54) METHOD OF MANUFACTURING AN OPTICAL FIBRE SUITABLE FOR HIGH TRANSMISSION RATES

(75) Inventors: Eric Aloysius Kuijpers, Eindhoven (NL); Peter Johannes Theodorus Pleunis, Weert (NL)

(73) Assignee: Draka Fibre Technology B.V., Eindhoven (NL)

( * ) Notice: Subject to any disclaimer, the term of this patent is extended or adjusted under 35 U.S.C. 154(b) by 0 days.

(21) Appl. No.: 11/245,894

(22) Filed: Oct. 6, 2005

(65) Prior Publication Data

US 2006/0037365 A1 Feb. 23, 2006

Related U.S. Application Data

(62) Division of application No. 10/093,088, filed on Mar. 6, 2002.

(30) Foreign Application Priority Data

Mar. 7, 2001 (NL) .................................... 1017523

(51) Int. Cl.
*G02B 6/02* (2006.01)
*C03B 37/018* (2006.01)
*C03B 37/023* (2006.01)

(52) U.S. Cl. ...................... 385/123; 385/124; 385/127; 65/415; 65/416; 65/417; 65/418; 65/419

(58) Field of Classification Search ........... 65/415–419
See application file for complete search history.

(56) References Cited

U.S. PATENT DOCUMENTS 4,793,843 A   12/1988 Pluijms et al. ............... 65/3.12

5,188,648 A   2/1993 Geittner et al. .............. 65/3.12
6,438,303 B1  8/2002 Abbott, III et al. ......... 385/123
2003/0161598 A1* 8/2003 Ellison et al. .............. 385/123

FOREIGN PATENT DOCUMENTS

EP   0 023 066 A1   1/1981
EP   0 209 945 A1   1/1987
EP   0 264 154 A2   4/1988

OTHER PUBLICATIONS

Nagel, S. et al.: "Latest Developments in Fiber Manufacture by MCVD and RFMCVD" Conference on Optical Fiber Communication, Digest of Technical Papers, OSA/IEEE, Jan. 24, 1984.
Geittner, P. et al.: "PCVD at High Deposition Rates," Journal of Lightwave Technology, vol. LT-4, No. 7, IEEE, Jul. 1986.
Bajorek, R. et al.: "Application of an Atmospheric-Pressure Microwave Plasma to the Optical Fiber Manufacturing Process" Plasma Chemistry & Plasma Processing, vol. 7, No. 3, Plenum Publishing Corporation, Sep. 1987.
Geittner, P. et al.: "Manufacturing Optical Fibres by the PCVD Process" Philips Technical Review 44, No. 8-10, pp. 241-249, May 1, 1989.

* cited by examiner

*Primary Examiner*—Michelle Connelly-Cushwa
(74) *Attorney, Agent, or Firm*—Seed IP Law Group PLLC

(57) ABSTRACT

The present invention relates to a method of manufacturing an optical fibre suitable for high transmission rates, which method comprises: i) supplying one or more glass forming precursors, and possibly a dopant, to a quartz substrate tube, ii) forming a plasma in the quartz substrate tube for the purpose of bringing about a reaction mixture so as to form glass layers, which may or may not be doped, on the interior of the substrate tube, iii) collapsing the substrate tube obtained in step ii) into a perform while heating, and iv) drawing an optical fibre from the perform while heating. The present invention furthermore relates to an optical fibre suitable for high transmission rates.

14 Claims, No Drawings

METHOD OF MANUFACTURING AN OPTICAL FIBRE SUITABLE FOR HIGH TRANSMISSION RATES

CROSS-REFERENCE TO RELATED APPLICATION

This application is a divisional of U.S. patent application Ser. No. 10/093,088, filed Mar. 6, 2002, now pending, which application is incorporated herein by reference in its entirety.

TECHNICAL FIELD

The present invention relates to a method of manufacturing an optical fibre suitable for high transmission rates, which method comprises the steps of:
  i) supplying one or more glass forming precursors, and possibly a dopant, to a quartz substrate tube,
  ii) forming a plasma in the quartz substrate tube for the purpose of bringing about a reaction in the reactive mixture so as to form glass layers, which may or may not be doped, on the interior of the substrate tube,
  iii) collapsing the substrate tube obtained in step ii) into a preform while heating,
  iv) drawing an optical fibre from the preform while heating.

The present invention furthermore relates to an optical fibre suitable for high transmission rates.

BACKGROUND INFORMATION

Such a method is known per se from U.S. Pat. Nos. 4,793,843 and 5,188,648 granted to the present applicant. From said the documents it is known that part of the dopant in the layers in the center may evaporate upon collapsing of the quartz substrate tube while heating. Said evaporation results in a disturbance of the refractive index profile in the final fibre. Said disturbance of the refractive index profile has an adverse effect on the bandwidth of the optical fibre.

The future developments in the telecommunication industry include the transmission of information at ever higher bit rates (bits/sec) over even longer distances. The present data networks use relatively low bit rates. Thus, light emitting diodes (LED) have so far been the most common light source in these applications. Because of the demand for data transmission rates which are higher than the modulation capacity of LEDs, laser sources will be used instead of LEDs. This shift manifests itself in the use of systems which are capable of supplying information at rates as defined in the GigabitEthernet Standard (IEEE 802.3z. 1998) and higher rates. GigabitEthernet Standard corresponds to a transmission rate of 1.25 Gigabit/sec.

The multimode optical fibre that is currently used in telecommunication systems has mainly been designed for being used with such LED light sources. In addition, said multimode fibre has not been optimized for use with the laser sources that are present in systems that have been designed for transmitting information at rates equal to or higher than GigabitEthernet. In other words, laser sources impose different demands on the quality and the design of a multimode fibre than LED sources. Especially, the refractive index profile in the center of the core of multimode fibres is of major importance, in which in particular a precisely defined parabolic profile is required so as to prevent a decrease of the information transmission rates. Accordingly, minor deviations in the center of the fibre profile may cause significant disturbances in the output signal, which disturbances have a major influence on the behavior of the system. This effect may manifest itself in the form of a very small bandwidth or a very high jitter, or both.

The wavelengths at which the data transmission in such fibres takes place are, respectively, the 850 m band, which is defined as 770 nm–920 nm herein, and the 1300 nm band, which is defined as 1260 nm–1360 nm herein.

BRIEF SUMMARY OF THE INVENTION

The object of the present invention is thus to provide a method of manufacturing an optical fibre suitable for being used in a multimode transmission system which is capable of transmitting data at rates equal to or higher than 1 Gigabit/sec. Such a multimode transmission system comprises a laser source, which transmits information at a rate of at least 1.25 Gigabit/sec, and a multimode optical fibre, which is irradiated by the laser source.

The object of the present invention is furthermore to provide a multimode optical fibre suitable for transmitting information with GigabitEthernet in the 1300 nm band over a distance of at least 1000 m.

The object of the present invention is furthermore to provide a multimode optical fibre suitable for transmitting information with GigabitEthernet in the 1300 nm band over a distance of at least 550 m as well as for transmitting information with GigabitEthernet in the 850 nm band over a distance of at least 550 m.

The object of the present invention is furthermore to provide a multimode optical fibre suitable for transmitting information at a rate of at least 10 Gigabit/sec in the 850 nm band over a distance of at least 300 m.

The object of the present invention is furthermore to provide a multimode optical fibre suitable for transmitting information at a rate of at least 10 Gigabit/sec in the 850 nm band over a distance of at least 300 m, in which said fibres have an OFL bandwidth of more than 500 Mhz.km.

Another object of the present invention is to provide a method of manufacturing optical fibres, which optical fibres are fully compatible for use with high-rate laser sources as well as with LED sources.

DETAILED DESCRIPTION

According to the present invention, the present method as referred to in the introduction above is characterized in that the glass layers, which may or may not be doped, are deposited on the interior of the substrate tube in such a manner that separate layers are obtained after steps iii) and iv) in a region having a diameter of 10 μm at the most in the center of the optical fibre that is finally drawn, wherein at least one of said separate layers has a surface area of 2 μm$^2$ at the most, wherein the refractive index value in the fibre that is finally drawn increases in the direction of the center thereof.

Using such a method, a very well-defined, layered structure of the core of the optical fibre is possible, as a result of which a precisely defined refractive index profile is obtained in the final fibre, in which the light pulse that is passed through the fibre will only widen to a minor extent, as a result of which the fibre will have a high transmission capacity.

It is in particular preferred for the layers that have been separately obtained in a region having a diameter of 10 μm at the most in the center of the optical fibre to have mutually different refractive index values.

The refractive index value of each layer can be influenced by supplying a dopant to the reactive mixture of glass forming precursors which has a higher refractive index value than said glass forming precursors. Said influencing can take place, for example, by varying the composition of the gaseous mixture that is to be supplied to the quartz substrate tube. The layer thickness can be influenced by varying the gas speed, the speed at which the plasma moves past the substrate tube and the plasma capacity itself.

It is in particular preferred to deposit the glass layers, which may or may not be doped, on the interior of the substrate tube in such a manner that separate layers are obtained in a region having a diameter of 10 µm at the most in the center of the fibre that is finally drawn, wherein each individual layer has a surface area of 1 µm² at the most, wherein the refractive index value in the fibre that is finally drawn increases in the direction of the center thereof.

The present invention furthermore relates to an optical fibre which is characterized in that said optical fibre is suitable for data transmission rates of at least 1 Gigabit/sec over a distance of at least 1000 m at a wavelength in the range of 1300 nm, wherein separate layers are obtained in a region having a diameter of 10 µm at the most in the center thereof, wherein at least one of said separate layers has a surface area of 2 µm² at the most, in particular 1 µm² at the most, wherein the refractive index value in the fibre that is finally drawn increases in the direction of the center thereof.

The present invention furthermore relates to a multi mode optical fibre which is characterized in that it is suitable for transmitting information at a rate of at least 1 Gigabit/sec in the 1300 nm band over a distance of at least 550 m and which is suitable for transmitting information at a rate of at least 1 Gigabit/sec in the 850 nm band over a distance of at least 550 m, wherein separate layers are obtained in a region having a diameter of 10 µm at the most in the center of the fibre that is finally drawn, wherein at least one of said separate layers has a surface area of 2 µm² at the most, in particular 1 µm² at the most, wherein the refractive index value in the fibre that is finally drawn increases in the direction of the center thereof.

The present invention furthermore provides a multimode optical fibre suitable for transmitting information at a rate of at least 10 Gigabit/sec in the 850 nm band over a distance of at least 300 m, wherein separate layers are obtained in a region having a diameter of 10 µm at the most in the center of the fibre that is finally drawn, wherein at least one of said separate layers has a surface area of 2 µm² at the most, in particular 1 µm² at the most, wherein the refractive index value in the fibre that is finally drawn increases in the direction of the center thereof.

The present invention is furthermore characterized by a multimode optical fibre suitable for transmitting information at a rate of at least 10 Gigabit/sec in the 850 nm band over a distance of at least 300 m, wherein said fibres have an OFL ("Over Filled Launch", measured bandwidth upon irradiation with an LED) bandwidth of more than 500 Mhz.km at 1300 nm, wherein separate layers are obtained in a region having a diameter of 10 µm at the most in the center of the fibre that is finally drawn, wherein at least one of said separate layers has a surface area of 2 µm² at the most, in particular 1 µm² at the most, wherein the refractive index value in the fibre that is finally drawn increases in the direction of the center thereof.

The present invention will be explained in more detail hereinafter by means of a number of examples, in which it should be noted, however, that the conditions used in the examples are merely described by way of illustration and should not be construed as being limitative. The term "cladding diameter" comprises the overall diameter of the optical fibre, excluding an external coating capable of being stripped which may be present.

EXAMPLES

Comparative Example 1

A multimode optical fibre was produced by means of the PCVD technique as described in steps i)–iv). During step i), 960 core layers having practically the same volume were deposited in the substrate tube, with the refractive index of each layer being increased in comparison with the preceding layer by changing the proportion of the glass forming precursors $SiCl_4$ and $GeCl_4$ that were supplied to the substrate tube. The refractive index profile was so controlled that the final fibre would be suitable for use on both the wavelength bands of 850 nm and 1300 nm that are frequently used at present. The preform thus obtained after collapsing in accordance with step iii) was drawn into an optical fibre having a core diameter of 62.5 µm and a cladding diameter of 125 µm. The layers in the optical fibre thus obtained appeared to have a surface area of 3.2 µm² each.

The fibre was subjected to a transmission test, using an 850 nm laser at a transmission rate of 1.25 Gigabit/sec. The maximum transmission distance for this fibre was 350 m, which value is too low to meet the present requirements.

Example 1

An optical fibre was produced by carrying out the same steps as in comparative example 1, with this difference that 2750 core layers were deposited so as to form a fibre having a core diameter of 62.5 µm. The layers in the optical fibre thus obtained each had a surface area of 1.1 µm². A transmission test of this fibre yielded a maximum transmission distance of 600 m at 1.25 Gigabit/sec and an 850 nm laser.

Comparative Example 2

Optical fibres were produced by carrying out the steps of example 1, wherein the refractive index profile was so controlled, however, that the fibre is optimized for use in the 850 nm band. The fibre, whose individual layers each had a surface area of 3.2 µm², was subjected to a transmission test of 10 Gigabit/sec. The maximum transmission distance at this bit rate through said fibre amounted to 250 m, which value does not meet the present requirement with regard to the transmission distance.

Example 2

An optical fibre produced by carrying out the steps of example 1, in which fibre the individual layers each had a surface area of 1.1 µm², transmitted a signal at 10 Gigabit/sec over a maximum distance of 350 m.

Example 3

A number of multimode optical fibres having a core diameter of 50 µm were produced by means of the PCVD technique as described in steps i)–iv). During step i), ±1600 core layers having practically the same volume were deposited in the substrate tube, with the refractive index of each layer being increased in comparison with the preceding layer by changing the proportion of the glass forming precursors $SiCl_2$ and $GeCl_4$ that were supplied to the substrate tube. The various refractive index profiles were so controlled that an optimum performance was obtained in the 850 nm band or in the 1300 nm band. The deposited layers in said fibres each had a surface area of 1.2 $\mu m^2$ each.

The fibres were subjected to transmission tests in both transmission bands at a transmission rate of 1.25 Gigabit/sec, the results of which tests are summarized below. From the table it is apparent that all the measured values meet the present requirements with regard to the transmission distance.

| Transmission band | Number of fibres | Lowest value of max. transmission distance | Average value of max. transmission distance |
|---|---|---|---|
| 850 nm | 12 | 960 m | 1010 m |
| 1300 nm | 15 | 2020 m | 2140 m |

Example 4

A multimode optical fibre was produced by means of the PCVD technique as described in steps i)–iv). In step i), 550 core layers having a relatively large volume were first deposited in the substrate tube, followed by the deposition of 120 core layers having a smaller volume, with the refractive index of each layer being increased in comparison with the preceding layer by changing the proportion of the glass forming precursors $SiCl_4$ and $GeCl_4$ that were supplied to the substrate tube. The refractive index profile was so controlled that the final fibre would be suitable for use on the wavelength bands of 850 nm and 1300 nm. The preform thus obtained after collapsing in accordance with step iii) was drawn into an optical fibre having a core diameter of 62.5 $\mu m$ and a cladding diameter of 125 $\mu m$. The layers in the optical fibre thus obtained appeared to have a surface area of 1.1 $\mu m^2$ each in a region having a diameter of 10 $\mu m$ in the center of the fibre. A transmission test of this fibre, using an 850 nm laser, yielded a maximum transmission distance of 600 m at a transmission rate of 1.25 Gigabit/sec. From this it becomes apparent that in particular the layers in the central portion of the optical core of the fibre must have a small surface area in order to meet the objective of the invention. The layers outside the central portion of the optical fibre having a diameter of 10 $\mu m$, on the other hand, may have a surface area of more than 2 $\mu m^2$.

What is claimed is:

1. A method of manufacturing a multimode optical fibre suitable for transmission rates equal to or higher than 1 Gigabit/sec, of the method comprising:
    i) supplying one or more glass forming precursors, and possibly a dopant, to a quartz substrate tube;
    ii) forming a plasma in the quartz substrate tube for the purpose of bringing about a reaction in a reactive mixture so as to form glass layers, which may or may not be doped, on an interior of the substrate tube;
    iii) collapsing the substrate tube obtained in ii) into a preform while heating; and
    iv) drawing an optical fibre from the preform while heating, wherein:
    the glass layers, which may or may not be doped, are deposited on the interior of the substrate tube in such a manner that separate layers according to ii) are formed in a region having a diameter of 10 $\mu m$ at most in a center of an optical fibre that is finally drawn, wherein at least one of said separate layers has a surface area of 2 $\mu m^2$ at most, wherein a refractive index value in the fibre that is finally drawn increases in a direction of the center thereof.

2. A method according to claim 1 wherein the glass layers, which may or may not be doped, are deposited on the interior of the substrate tube in such a manner that separate layers according to ii) are formed in the region having the diameter of 10 $\mu m$ at the most in the center of the optical fibre that is finally drawn, wherein at least one of said separate layers has a surface area of 1 $\mu m^2$ at most, wherein the refractive index value in the fibre that is finally drawn increases in the direction of the center thereof.

3. The method of claim 1 wherein the separate layers in the region having the diameter of 10 $\mu m$ at the most have mutually different refractive index values.

4. The method of claim 3, further comprising supplying the dopant to the reactive mixture, the dopant having a higher refractive index value than the glass forming precursor, so as to influence the refractive index value in each layer.

5. The method of claim 4 wherein influencing the refractive index value in each layer includes varying a composition of a gaseous mixture that is supplied to the quartz substrate tube.

6. The method of claim 1, further comprising influencing a thickness of one or more of the layers by varying a speed at which the plasma moves past the substrate tube or by varying plasma capacity.

7. The method of claim 1, further comprising changing a proportion of different glass forming precursors, which are supplied to the quartz substrate tube, relative to each other so as to provide different refractive index values for adjacent layers.

8. A method to manufacture a multimode optical fibre suitable for transmission rates equal to or higher than 1 Gigabit/sec, the method comprising:
    i) supplying one or more glass forming precursors, and possibly a dopant, to a quartz substrate tube;
    ii) forming a plasma in the quartz substrate tube to bring about a reaction so as to form glass layers, which may or may not be doped, on an interior of the substrate tube;
    iii) collapsing the substrate tube obtained in ii) into a preform while heating,
    iv) drawing an optical fibre from the preform while heating, wherein:
    the glass layers, which may or may not be doped, are deposited on the interior of the substrate tube in such a manner that separate layers are obtained after iii) and iv) in a region adjacent to a center of an optical fibre that is finally drawn, wherein at least one of said separate layers has a surface area of 2 $\mu m^2$ at most, wherein a refractive index value in the fibre that is finally drawn increases in a direction of the center thereof, wherein the separate layers in the region of the optical fibre have mutually different refractive index values.

9. The method of claim 8, further comprising supplying the dopant, the dopant having a higher refractive index value than the glass forming precursor, so as to influence the refractive index value in each layer.

10. The method of claim 9 wherein influencing the refractive index value in each layer includes varying a composition of a gaseous mixture that is supplied to the quartz substrate tube.

11. The method of claim 8, further comprising influencing a thickness of one or more of the layers by varying a speed at which the plasma moves through the substrate tube.

12. The method of claim 8, further comprising influencing a thickness of one or more of the layers by varying plasma capacity.

13. The method of claim 8, further comprising changing a proportion of different glass forming precursors, which are supplied to the quartz substrate tube, relative to each other so as to provide different refractive index values for the layers.

14. The method of claim 8 wherein the region adjacent to the center has a diameter of 10 μm$^2$ at most.

* * * * *

UNITED STATES PATENT AND TRADEMARK OFFICE
CERTIFICATE OF CORRECTION

PATENT NO. : 7,116,877 B2  Page 1 of 1
APPLICATION NO. : 11/245894
DATED : October 3, 2006
INVENTOR(S) : Kuijpers et al.

It is certified that error appears in the above-identified patent and that said Letters Patent is hereby corrected as shown below:

Column 8
Line 5, "10 $\mu m^2$" should read as --10$\mu m$--.

Signed and Sealed this

Twelfth Day of August, 2008

JON W. DUDAS
*Director of the United States Patent and Trademark Office*